(No Model.)
2 Sheets—Sheet 1.
T. E. BROWN.
DRAWBRIDGE.
No. 590,787. Patented Sept. 28, 1897.
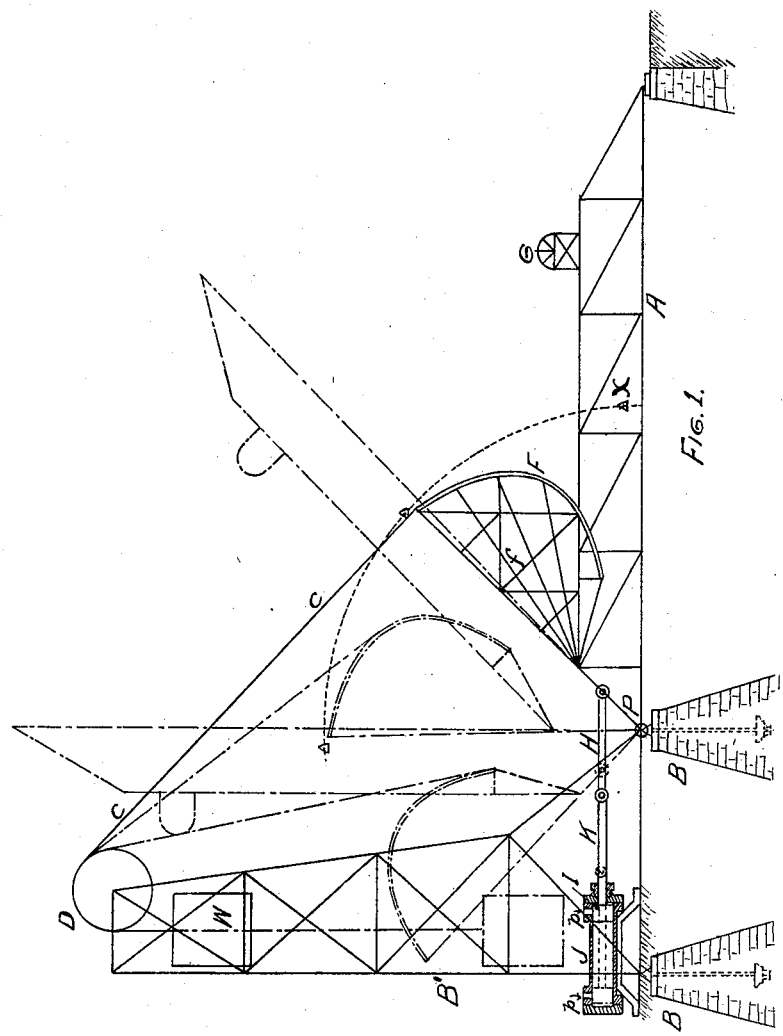
WITNESSES:
Henry N. Brown
Bernard J. Isecke.
INVENTOR
Thomas E. Brown
BY
D. Walter Brown
his ATTORNEY (No Model.)  T. E. BROWN.  2 Sheets—Sheet 2.
DRAWBRIDGE.
No. 590,787.   Patented Sept. 28, 1897.
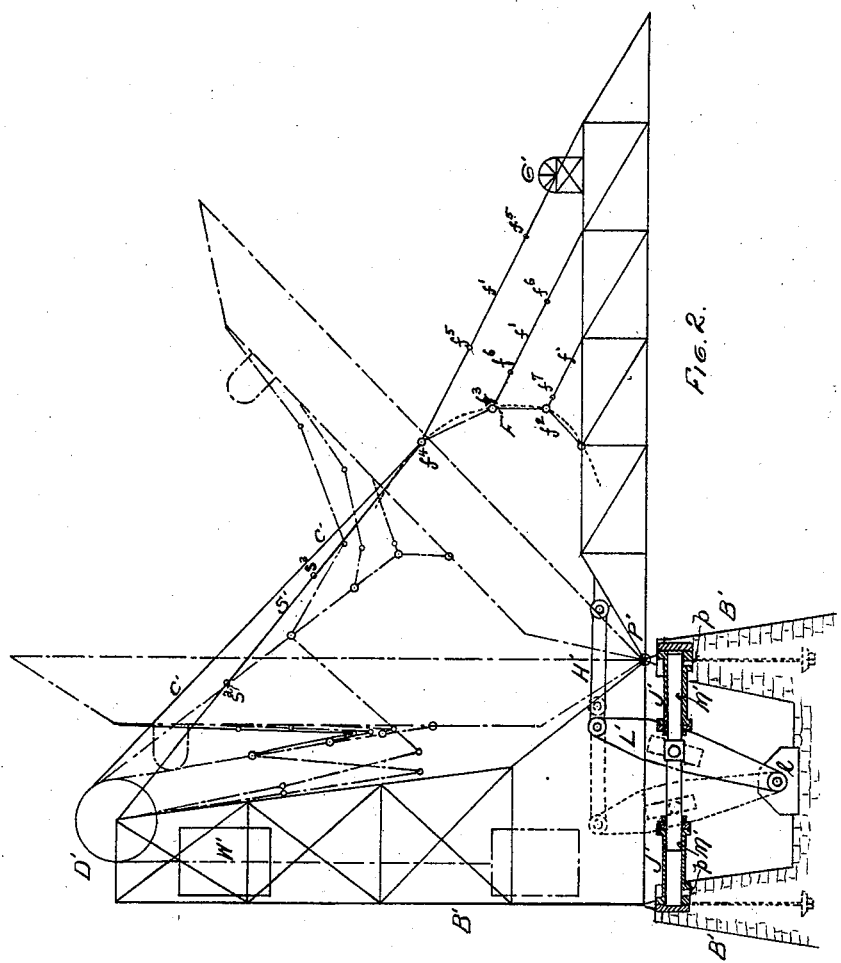
WITNESSES:　　　　　　　　　　　　　　INVENTOR
Henry V. Brown.　　　　　　　　　　　Thomas E. Brown
Bernard J. Decke.
　　　　　　　　　　　　　　　　BY
　　　　　　　　　　　　　　　D. Walter Brown
　　　　　　　　　　　　　　　　his ATTORNEY

UNITED STATES PATENT OFFICE.

THOMAS E. BROWN, OF NEW YORK, N. Y.

DRAWBRIDGE.

SPECIFICATION forming part of Letters Patent No. 590,787, dated September 28, 1897.

Application filed September 18, 1896. Serial No. 606,198. (No model.)

*To all whom it may concern:*

Be it known that I, THOMAS E. BROWN, a citizen of the United States, and a resident of the city of New York, in the county and State of New York, have invented certain new and useful Improvements in Drawbridges, of which the following is a specification.

This invention relates to improvements in drawbridges of that type which revolve in a vertical plane and are balanced by a counterweight.

Especially the invention relates to the rigging by which the cables of the counterweight are connected with the bridge in such a manner that the pull of the counterweight on the bridge shall vary exactly as the turning moment of the bridge about its pivot varies. It is well known that as such a bridge structure revolves around its pivot, its center of gravity remaining at a constant radial distance from the pivot, the turning moment or lever-arm of the bridge becomes less and less until when the center of gravity is vertically over the pivot the length of the lever-arm becomes zero. Therefore in order that a constant counterweight shall balance the bridge in all its positions it is necessary that the length of the lever-arm with which the counterweight acts on the bridge shall vary in exactly the same proportion as the length of the lever-arm of the center of gravity of the bridge varies as the bridge changes its position. I effect the desired variation in the length of the lever-arm of the counterweight by connecting the cable of the counterweight with the bridge by rigging so arranged that as the bridge changes its position the point of application of the pull of the counterweight on the bridge shall change its position in such a manner that the mathematical consequence is the variation of the length of the lever-arm with which the counterweight acts on the bridge in the same proportion as the length of the lever-arm of the center of gravity of the bridge varies. In the drawings which accompany the specification I show two means of effecting this variation in the length of the lever-arm of the counterweight, and both illustrate the same general principle, which is, in effect, the passing of the cable or chain of the counterweight around a curve or "saddle" which is fixed on the bridge and has the surface on which the cable is wound so shaped that the perpendicular distance from the pivot of the bridge to the cable, or the cable produced, is equal to the radial distance of the center of gravity of the bridge from the pivot, multiplied by the cosine of the angle which the radius makes with the horizontal, multiplied by the weight of the bridge and divided by the weight of the counterbalance. The lever-arm of the counterbalance, in effect, depends upon the manner in which cable unwraps from the curved surface of the saddle, so as to determine the point of connection between the bridge and the cable and the direction of the cable at that point. Therefore evidently if for the curved surface I substitute some other rigging so arranged that the successive points at which the pull of the cable takes effect lie on such a curve as the saddle would have if it were used, then the effect of this rigging for each of those points will be the same as that of the saddle, and by bringing these points close enough together I will have a counterbalancing effect which cannot be distinguished from that produced when the curved saddle is used. In practice I find that it is not necessary to employ very many of such points, for the length and direction of the chord of the curve of the saddle varies so little from the curve itself as to have no practical effect in disturbing the counterbalance.

Referring to the drawings which accompany the specification to aid the description, Figure 1 is an elevation of a lift-bridge equipped with my counterbalancing device arranged with a saddle, as hereinbefore mentioned. Fig. 2 is an elevation of a similar bridge with a modification in the rigging by which the counterbalancing-cable is connected with the bridge to produce the counterbalancing effect of the curved saddle.

In Fig. 1 I show a double-acting hydraulic ram connected directly with the bridge for raising and lowering the same.

In Fig. 2 I show two single-acting hydraulic rams connected with an oscillating beam and that with the bridge for raising and lowering the same.

It will be understood that the figures show the counterbalancing devices for only one side of the bridge, but that in practice these devices will be duplicated, there being one set for each side. In the description which follows reference is made to the devices on the one side only, the corresponding parts being similar on the other side.

Referring to Fig. 1, A is a drawbridge-span, B being the piers. P is the pivot about which the bridge turns; B', the tower; C, the counterweight-cable; D, the guide-sheave for the same on the top of the tower, and W the counterweight. The weight of said counterweight W is preferably just sufficient to balance the bridge when the latter is in the lower position of Fig. 1. F is a saddle secured, preferably, to the upper side of the bridge, as shown, by any suitable framing $f$. Said saddle F is a curved way or guide around which is laid the cable C, the lower end of said cable being of course fastened in the saddle or to some part of the bridge back of the lower end of said saddle F.

As the bridge takes different positions the cable C will of course unwrap from the saddle, said cable forming the tangent to the curve. The curve of the said saddle is developed so that the perpendicular distance from the pivot P to the cable C shall vary in exactly the same proportion as the cosine of the angle of the line drawn through P and the center of gravity of the bridge X with the horizontal varies; but the turning moment of the bridge or its lever-arm is always proportional to the cosine of said angle. Therefore the lever-arm of the counterbalance W will vary in exactly the same proportion as the lever-arm of the center of gravity of the bridge varies, and if the counterbalance be once so adjusted as to exactly balance the weight of the bridge in, say, its lower position it will balance the weight of the bridge in all positions whatsoever. It will be seen that the said saddle F will project into the tower B' when the bridge is up unless the tower is set back some distance. Where there is not room to set the tower back, it must be of an open construction to receive the saddle F.

On or near the end of the bridge I place a curved buffer-frame G. This is of such a size and shape and so positioned that when the bridge is up it will be in contact with the cable C, and should any cause, such as a stiff wind, tend to move the bridge back beyond its proper height said buffer-frame G will press on the said cable and force it back to a sufficient extent to cause the counterweight W, by reason of its rapidly-increasing lever-arm, to resist further movement of the bridge. The bearing-surface of the buffer-frame G is curved on a radius sufficiently easy to allow the cable C to bend without injury. It will be noticed that there will be a corresponding buffer-frame G at the other side of the bridge.

In cases where for want of room or any other cause it is undesirable to use the saddle F, I attain the desired result by substituting for the saddle the rigging shown in Fig. 2. Said rigging consists of links F', pivoted together, as shown in Fig. 2, the lowest link being also pivoted to the bridge. The hinge or pivot point between two adjacent links is also connected by flexible tension connections $f'$ with proper points on the bridge in such a manner that the said hinges or pivotal connections $f^2 f^3 f^4$, and so on, lie on the curve which would be given to the surface of the saddle if such were used. The counterweight-cable C' is connected with the uppermost hinge $f^4$, as shown. It is evident, therefore, that for each hinge $f^4 f^3 f^2$ the lever-arm of the counterweight will be exactly the same as it would have been if the curved saddle were used, and for those points the counterbalance will be perfect. Even with three links F', as shown, the length of the link—which is to say, the cord of the curve of the saddle—varies so little from the curve that in practice the counterbalance remains substantially perfect at all points. Manifestly by increasing the number of the hinge-points $f^2 f^3 f^4$, and so on, the approximation to perfect counterbalance will be even closer. I prefer to form the tension connections of separate members or rods, as indicated, and to hinge these together at the points $f^5 f^6 f^7$ in such a manner that as the bridge rises the various members or bars of the tension connections will fold up, as indicated by dotted lines in Fig. 2.

In these bridges the end of a span of a single-span bridge would ordinarily rest on an abutment, and if the bridge were composed of two spans meeting over the center of a stream, then on a pier in the middle of the stream. In many cases such a center pier would interfere with navigation and must be omitted, and I therefore substitute in such cases the suspenders S', as shown in Fig. 2, one for each side of the bridge. The lower end of these suspenders is preferably connected to the hinge $f^4$ and the upper end is fastened to the tower. Since the counterbalance W' exactly counterbalances the weight of the bridge, the suspenders S' have only to sustain the strains due to extraneous loads on the span. I prefer to form the suspenders S' of members or links hinged together, as at points $s^2 s^3$, so that the various members will fold up when the bridge is raised, as indicated in the drawings.

In Fig. 1 J is a double-acting hydraulic motor-cylinder, I being the piston, and $p\ p$ ports. The piston I is connected with the bridge A by the links H K. The cylinder J will be controlled by any suitable valves, and according as water is admitted at one or the other end of the cylinder will the bridge be raised or lowered by the direct action of the piston on the bridge.

In Fig. 2 I show two single-acting cylinders J' J', arranged directly opposite to each other. The piston or pistons M' of said cylinders are pivotally connected midway between the cylinders with the oscillating beam L', pivoted at $l$. The upper end of said beam L' is connected by link H' with the bridge. According as water is admitted to one or the other of said cylinders J' will the bridge be raised or lowered.

In both the arrangements of motors in Figs. 1 and 2 the pistons are sufficiently long to pass by and close the ports *p* when approaching the corresponding end of their stroke. In this manner a water-cushion is formed in advance of the piston, which brings it to rest gradually and aids in holding the bridge in position. It is necessary, therefore, to taper the end of the piston so as to gradually close the port, or to curve or drill holes in the piston, or if the piston be left cylindrical then the ports *p* will be V-shaped, as is well known in the art. It will also be necessary to so arrange the controlling-valves as to admit pressure around to the front side of the pistons to start them back again when desired. I do not show such valves, because their use is well known in the art.

While I prefer to operate the bridge with hydraulic motors, as hereinbefore stated, I am of course not restricted to that means of operating it, but may employ any suitable device for the purpose.

Now, having described my improvements, I claim as my invention—

1. The combination with a hinged bridge, a counterweight, and a cable connected with the counterweight, of means for connecting said cable operatively with the bridge, which means are provided with a number of points arranged in a curve such that the perpendicular distance between the hinge of the bridge and the line of pull of the cable varies during the movement of the bridge proportionally to the variation of the lever-arm of the center of gravity of said bridge, substantially as described.

2. The combination in a hinged-bridge-operating device, of a counterweight, a cable therefrom operatively connected with said bridge, a plurality of links from said cable to said bridge, and flexible tensional devices from said links to said bridge adapted to coöperate with the tension of the cable in holding the pivots of said links on a curve such that the perpendicular distance between the hinge of the bridge and the tangents to said curve varies in the same proportion as the lever-arm of the center of gravity of the bridge varies during movement of the bridge, substantially as described.

3. The combination with a hinged bridge, of a counterweight, a cable therefrom to the bridge, and a suspender adapted to support said bridge in its lower position and composed of a plurality of folding links, substantially as described.

4. The combination in a lift-bridge-operating device, of a counterweight W, a cable C from said counterweight adapted to lift said bridge and carried around a point above the bridge, links and tensional devices connecting the end of said cable to said bridge, and a suspender S adapted to sustain the bridge when in the lower position, substantially as described.

5. The combination in a lift-bridge-operating device, of a counterweight W, a cable C from said counterweight adapted to lift said bridge and carried around a point above the bridge, links and tensional devices connecting the end of said cable to said bridge, and a suspender S adapted to sustain the bridge when in the lower position, and said suspender S formed of a plurality of hinged links adapted to fold as the bridge rises, substantially as described.

6. The combination with a lift-bridge, a counterweight, and a cable from the counterweight to the bridge for lifting the same, of a buffer-frame near the end of the bridge and adapted when the bridge is in the upper position to exert tension on the cable against the counterweight, whereby the counterweight is enabled to limit the backward motion of the bridge, substantially as described.

7. The combination with a hinged bridge, a counterweight, and a cable connected with the counterweight, of a motor for moving said bridge adapted to hold the bridge in any position, and means for connecting said cable operatively with said bridge, which means are provided with a number of points arranged in a curve such that the perpendicular distance between the hinge of the bridge and the line of pull of the cable varies during the movement of the bridge proportionally to the variation of the lever-arm of the center of gravity of said bridge, substantially as described.

In testimony that I claim the foregoing as my invention I have signed my name, in presence of two witnesses, this 17th day of September, 1896.

THOMAS E. BROWN.

Witnesses:
HENRY V. BROWN,
BERNARD J. ISECKE.